Feb. 26, 1963 J. L. BARKER 3,079,587
INTERLINKING SYSTEM FOR TRAFFIC ACTUATED CONTROL APPARATUS
Filed Nov. 5, 1958 9 Sheets-Sheet 1

INVENTOR.
JOHN L. BARKER
BY
Edward T. Eaus
ATTORNEY

Feb. 26, 1963 J. L. BARKER 3,079,587
INTERLINKING SYSTEM FOR TRAFFIC ACTUATED CONTROL APPARATUS
Filed Nov. 5, 1958 9 Sheets-Sheet 5

FIG. 5A

INVENTOR
JOHN L. BARKER
BY Edward W. Pains
ATTORNEY

FIG. 5C

Feb. 26, 1963 J. L. BARKER 3,079,587
INTERLINKING SYSTEM FOR TRAFFIC ACTUATED CONTROL APPARATUS
Filed Nov. 5, 1958 9 Sheets-Sheet 8

FIG. 6

INVENTOR
JOHN L. BARKER
BY
Edward H. Eames
ATTORNEY

Feb. 26, 1963

J. L. BARKER 3,079,587

INTERLINKING SYSTEM FOR TRAFFIC ACTUATED CONTROL APPARATUS

Filed Nov. 5, 1958

INVENTOR.
JOHN L. BARKER
BY
Edward W. Eames
ATTORNEY

United States Patent Office 3,079,587
Patented Feb. 26, 1963

3,079,587
INTERLINKING SYSTEM FOR TRAFFIC ACTUATED CONTROL APPARATUS
John L. Barker, Norwalk, Conn., assignor, by mesne assignments, to Laboratory for Electronics Inc., Boston, Mass., a corporation of Delaware
Filed Nov. 5, 1953, Ser. No. 772,059
27 Claims. (Cl. 340—40)

This invention relates generally to information transmission systems and, more particularly, to an interlinking system for remotely controlled traffic control equipment.

With the continued development of self-propelled vehicles—such as the automobile, the roadway and highway systems have developed to the point that they now extend to many locations and intersect one another at many points.

At an early date, it was recognized that it was necessary to control the flow of vehicles over this highway system, especially at the points of intersections. A system of using signal controls at intersections—such as the light-type signal control utilizing "stop" and "go" signals in the form of red signals for "Stop" and green for "Go" on a fixed time cycle—soon developed. Since signals of this type had a fixed time cycle so that the green was on for a fixed period and then the red was on for a fixed period, congestion at intersections often developed due to the use of such a signal since often traffic in a north-south or south-north direction would be extremely heavy at a period with very little or no traffic in an east-west or west-east direction on the intersecting road. Under circumstances such as these, it would be entirely unnecessary for their to be a long period in the cycle wherein the right of way was given to the east-west or west-east traffic portion of the road at the expense of the north-south or south-north traffic on the highway. With such an arrangement, at times a vehicle on the north-south road would be halted at a red light waiting for the light to turn green, and at the turn of the green light, the traffic would proceed through the intersection, but because of the shortness of the green cycle certain of these vehicles which had been waiting to proceed would not be able to clear the intersection prior to the change of the light and would be once again stopped. As incidences such as this continued to recur, it was often necessary for the various towns and cities to revert back to the use of individuals directing traffic at heavier than usual flow periods in order to avoid congestion being increased by the use of the "stop"-"go" signal.

Various solutions were attempted and a major advance in this regard was the introduction of traffic system controls wherein a traffic signal was controlled by a control unit which regulated the cycle or time of red period or the time that the red signal was on during the traffic light cycle and the time that the green period of signal was utilized in accordance with information received from the traffic flowing through the intersection so that the system, in effect, took on the aspect of intelligence and could determine the portion of the cycle which should be allotted to the green signal for flowing along the highway having the major portion of traffic at a particular moment and the portion of the cycle which should be allotted to the roadway having the minimum of traffic at the moment.

Thus, with systems such as these, at a time when there was little or no traffic on an east-west intersection, the cycle of the traffic signal would be such that the portion of the cycle during which time the red signal controlled the east-west road would be maximum so that the portion of the cycle during which traffic could proceed along the main highway would be by far the larger portion of the traffic signal cycle.

The information on the flow of traffic in a system of this type is obtained by having a sampling or measuring position located in the highway either in the north-south main highway when the north-south is the main highway, or in the east-west highway when that is the main highway, or in both. The measuring position could utilize a number of various available means of counting vehicles and these means would be located in the highway as when treadles or units responsive to the weight of a vehicle passing thereover are used, or located adjacent a highway as when an electronic beam or a photoelectric means are used.

The systems and mechanisms, designed to interpret and use the flow information obtained at the sampling or measuring position in order to actuate the individual traffic signals, have been many and varied and the subject of many patents. Examples of these are: Patent No. 2,241,047, issued May 6, 1941, to H. A. Wilcox; Patent No. 2,110,723, issued March 8, 1938, to C. D. Geer and J. L. Biach; Patent No. 2,122,411, issued July 5, 1938, to E. H. Eames; Patent No. 2,105,443, issued January 11, 1938, to A. P. B. Renshaw; Patent No. 2,542,978, issued February 27, 1951, to J. L. Barker, and my copending application Serial No. 510,926, filed May 25, 1955, which has become issued as U.S. Patent 2,989,728 and which will be referred to below.

From a consideration of the above-cited art, it can be seen that traffic control systems have been becoming more sophisticated and complicated through the years with corresponding increases in complications in the hardware and components used. Thus, where at one time few components were used, now in order to accomplish the more intricate interpretation of signal and varsatility of the system, a substantially greater number of components must be used.

Present systems of traffic signals can be controlled by a single central unit which is referred to as a master control unit. Information from detectors or the like at various sampling positions is fed to the master unit which interprets the information and, in accordance with the interpretation, feeds information out of the master control unit to local signal controllers which—inturn—control the cycle of traffic signals with which they are associated. Usually, one local controller is utilized to control each traffic signal and one master controller is utilized to control the various local controllers.

Many traffic detectors are used which are spaced at various positions throughout the traffic system and the information obtained at the detector as to the counting of vehicles passing thereby or thereover is fed to the master controller which operates upon and interprets this information and then feeds controlling signals to each of the local controllers which—in turn—operate the local traffic signals in response to the counting by the detectors. Of course, provision is made for separating the various local control units from the master, and also provision is made for having the individual local controllers affected by additional detectors, such as detectors in the cross streets which when in use feed a signal directly to the local controller so that the local controller, in addition to controlling the traffic signal in accordance with information fed from the master controller, also at times interjects into the cycle dictated by the master controller an occurrence or event dictated by information received from the local detector or detector in the cross street. This, of course, is old in the art.

The resultant problem of many leads and connections in installations running throughout the city is obvious.

If each sampling position must have the information which is detected at that point transmitted to the geographical location of the master controller, and then—inturn—the information from the master controller must be fed individually to each of the local controllers, a tremendous number of information transmission channels must be utilized. If these are wire channels and the system is placed in the streets of a city, they may be placed under the streets, which is a costly process both as to initial installation and as to keeping such systems in repair. If the wires are overhead wires, then other difficulties arise in connection with clearance of buildings and other obstructions, and also in each of these instances, problems of right-of-way arise so that it is an extremely expensive and difficult operation to install a complicated, sophisticated system in a city initially, as well as an expensive and complicated maintenance problem.

The present invention provides a method of eliminating the many connected wires necessary in traffic control systems utilizing components of the type described in the patents above referred to. The present invention is concerned primarily with an interlinking system for traffic actuated control apparatus for transmitting information from various sampling positions to a remote master controller and—in turn—transmitting the information from the remote master controller to the various local control units for control of the traffic signal.

In one form of this invention, which is the preferred form, a radio transmission system is presented. This radio linking or interconnect of the various components and units of a traffic control system eliminates completely the necessity of expensive wiring installations and the problems coincident therewith.

A second embodiment of this invention discloses a two-wire or duplexing system for interconnecting the various components of a traffic control system so that the information can be transmitted from the sampling position to the remote master controller and then in turn transmitted to the local control units with a minimum of wiring; for example: a two-wire connection between each detector unit and a two-wire connection between a group of sampling positions and the remote master controller. Also a two-wire connection from the remote master controller to each of the local control units. One of each of these two wires is a common or ground wire and if other means of grounding the system can be provided, this can be used, thus making this interconnect a single wire interconnect system.

In order to accomplish this, special input and output information circuit systems have been designed for use in connection with traffic detectors, local controllers and a remotely-located master control. For purposes of explanation of this system, the invention is described as used in connection with a master control unit of the type shown and described in the previously referred to Patent No. 2,542,978 and a local controller of the type shown and described in my co-pending application Serial No. 510,926, which was previously referred to above. However, it should be understood that the invention described herein can be utilized as an information transmission system for systems and devices other than those described here of the traffic control type or otherwise.

It is understood that such an information transmission system can be used outside of the traffic control field; however, it is designed especially for use with a traffic control system wherein a remotely-located master unit is used to control information supplied to a local signal controller for control of a local traffic signal in accordance with information received from detector units remotely located from the master.

The invention disclosed herein has as its principal object the furnishing of a new interlinking system for traffic control components which allow for transmission of information while avoiding the use of complicated and costly multiple wire interlinks.

A further object of this invention is to provide a system for converting the input and output information from conventional traffic control components and units so that the conventional components and units can be interlinked or connected without the use of multiple wire interlinks.

A further object of this invention is to provide a system which can be adapted to conventional traffic control equipment to link together the conventional traffic control equipment.

Still another object of this invention is the provision of a versatile interlinking system for traffic control equipment whereby certain components and units of a traffic control system can be interconnected thereby and other components and units of a traffic control system can be interconnected by more conventional means.

And still another object of this invention is to provide an interlinking system for traffic control components which will operate over a long period of time free from all difficulties and with a minimum of maintenance.

An interlinking system for traffic control components embodying this invention and the manner of using the same is described herein with references to the drawings, and in which.

Figure 1:
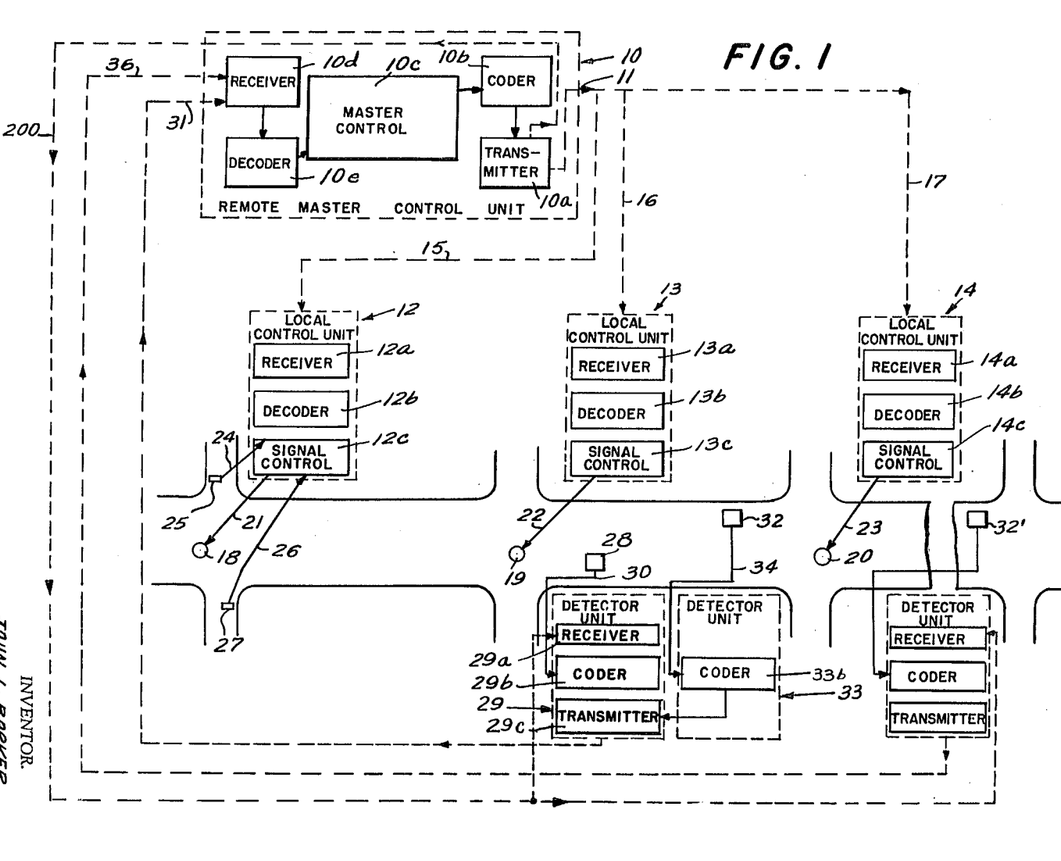
FIG. 1 illustrates in diagrammatic form a main highway which is intersected at several points by side roads and which has placed at each intersection a traffic signal which is controlled by a local signal control unit under the influence of a remote master controller and which has detector positions located in the roadways.

A diagrammatic showing of the system is made in FIG. 1 wherein a remote master control unit 10 is shown feeding information indicated by the arrow 11 to local control units 12, 13 and 14. Information 11 is shown being fed into local control unit 12 by arrow 15, into local control unit 13 by arrow 16, and local control unit 14 by way of arrow 17.

For purposes of this illustration, it is assumed that information 11 is fed into local control units 12, 13 and 14 so that information 15, 16 and 17 can be identical even though individual local control units receive the information on separate inputs. It should be understood, however, that more than one form of information can be transmitted from remote master control unit 10 so that local control units can be arranged to receive information which is not common to all. However, in the simplest case which is utilized for purposes of explanation herein, each local control unit is assumed to be receiving identical information.

Local control unit 12 controls the cycle of traffic signal 18, local signal control unit 13 controls the cycle of traffic signal 19 and local signal control unit 14 controls the cycle of traffic signal 20 by transmitting control information indicated in FIG. 1 by the arrows 21, 22 and 23, respectively.

Additional control information is shown being fed into local control unit 12 in the form of arrow 24 extending from detector 25 and arrow 26 extending from detector 27. Detectors 25 and 27 are located in the cross-road which intersects the main highway, and, as is common in the art—and as will be referred to herein below, these detectors can interrupt or modify the cycle of traffic signal 18 so as to allow cross traffic to proceed even though the local control unit is receiving signals from the remote master control unit 10.

Detector 28, which is placed in one side of the main highway, can be of the type which is actuated by the weight of a vehicle passing thereover to supply one pulse for each vehicle axle or other counting unit to detector unit 29 by arrow 30 which information is—in turn—conveyed to the remote master control unit by arrow 31.

Additionally, detector 32 is placed in the opposite side of the road to count vehicles passing thereover and the count information obtained by detector 32 is fed to detector unit 33 by means of arrow 34, and thence to the remote master control unit 10 by way of the transmitter 29c of detector unit 29 and arrow 31. Additionally, arrow 36 represents other possible information fed into the remote master control unit 10. Arrow 36 represents the information from any other detector unit which may be spaced on this highway or in related roads. Thus, the remote master control unit can receive signals from any number of detector units, operate on this information and feed signal information to any number of local control units. For simplicity of explanation herein, information will be assumed to come from detectors 28 and 32 alone and be fed to remote master control unit 10 since this is illustrated by way of example only.

It is seen, therefore, that the traffic control system illustrated in FIG. 1 consists of a single remote master control unit and a series of local control units; each local control unit operating a traffic signal. The remote master control unit and the local control units are linked together by a portion of the interlink system which is the subject of this invention. Also, two conventional detectors are illustrated as placed on either side of the main highway and feed information to a detector unit which transmits information to the remote master control unit by a portion of the interlink which is the subject of this invention.

Since the information which actuates the local signal control units and the traffic signals is obtained by means of the detectors 28 and 32, consideration will first be given to a detector and its associated detector unit.

Figure 2:
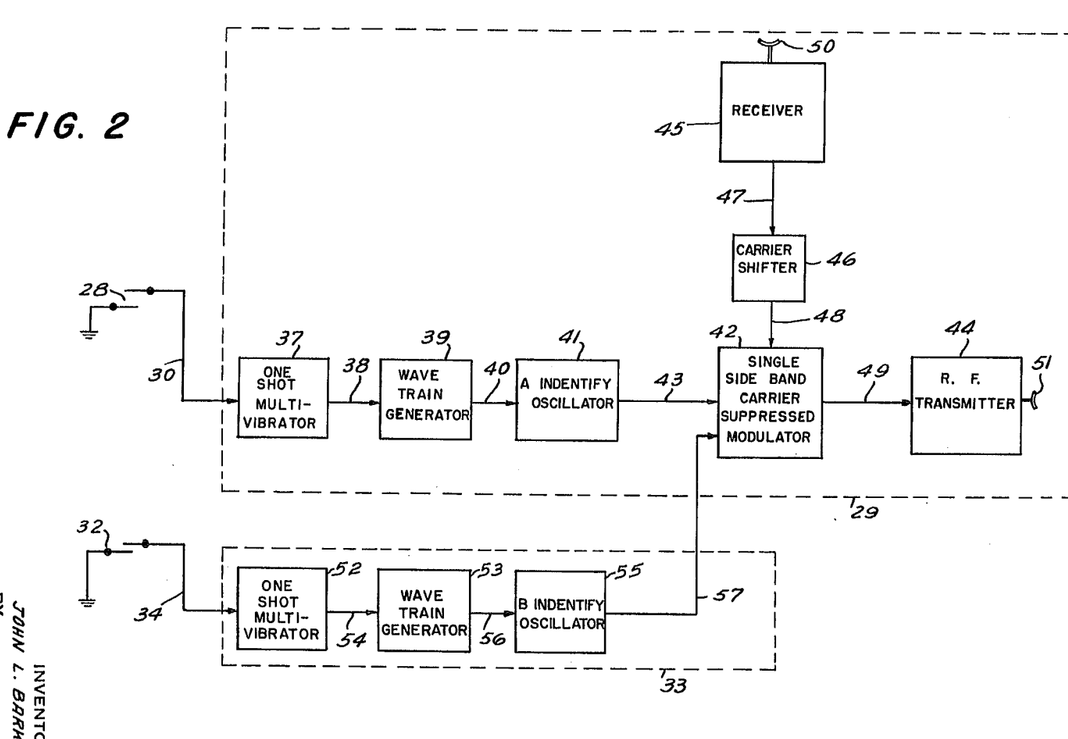
FIG. 2 illustrates in diagrammatic form a detector unit which converts counting information to a form suitable for usage in the interlink system.

FIG. 2 of the drawings shows by way of example detector 28 and the associated detector unit 29. At each instance, when the axle of a vehicle passes over detector 28, a signal is fed by channel 30 to a controlled impulse generator which can be a multivibrator of the type which is referred to as a "one-shot" multivibrator which gives a substantially square wave output for each vehicle axle detected by the detector. The square wave output of the multivibrator 37 is then fed by means of channel 38 to a wave train generator 39 which develops a fixed number of square pulses for each square wave received from the impulse generator 37. Thus, for example, five square pulses can be developed at the output of the wave train generator 39 for each pulse input from the multivibrator 37. It should be understood that the number of pulses from the wave train generator is the same each time that the wave train generator is activated by the signal from a multivibrator. Thus, in this example, the wave train generator 39 is designed to supply five square pulses for each and every signal from the multivibrator. The pulses from wave train generator 39 are fed by means of input 40 to identification oscillator 41. Identification oscillator 41, for example, can be of the Colpitts type or any other suitably stable oscillator which is commonly used for this purpose. Oscillator 41, when activated, oscillates at a fixed frequency. For example, oscillator 41 shown herein may oscillate at a frequency of 400 cycles for each time that it is activated, and the oscillator 41 is activated only at those times that it is receiving a pulse from the wave train generator. Thus, for each pulse of the wave train generator, the oscillator 41 develops a series of sine waves which have a frequency of 400 cycles. Thus, the pulses from the wave train generator trigger identification oscillator 41 resulting in an output from the identification oscillator of five short pulses in the form of the frequency of the identification oscillator such as 400 cycles for every pulse from the "one shot" multivibrator 37. The output from identification oscillator 41 is applied to single side band carrier suppressed modulator 42 by means of channel 43 which—in turn—modulates the transmitter 44. The carrier for modulator 42 and transmitter 44 is obtained from receiver 45 and shifted slightly in frequency by a predetermined amount in carrier shifter 46 and as so shifted is applied to modulator 42. In the drawing, the carrier is shown being channelled by arrow 47 to the carrier shifter and then the shifted carrier is shown being applied by channel 48 to modulator 42 which, in turn, applies its signal by channel 49 to transmitter 44, which is a radio frequency transmitter—although it could transmit at any other suitable frequency.

Receiver 45 obtains the carrier frequency from the remote master control unit by means of channel 200, as will be explained below. The carrier frequency, which is used in the remote master control unit is used throughout the system, and in this case, the carrier frequency which is transmitted from the master to the local control units is received at receiver 45 and shifted somewhat and utilized in transmitter 44 in the local detector unit 29. By using a common carrier reference in the system, the system obtains greater stability as the carrier then becomes the reference of the system.

Antennas 50 and 51 are shown attached to receiver 45 and transmitter 44, respectively. As can be seen by referring once again to FIG. 1, the detector unit is an entity and detector unit 29, in effect, converts the information received in detector 28 to a form so that it can be transmitted to the remote master control unit and makes such transmission by means of the transmitter 44.

Each detector has a detector unit associated therewith. Detector unit 33 in the system shown in FIG. 1 has its own controlled impulse generator and a wave train generator which are respectively, of the type 37 and 39 as shown in FIG. 2. However, the identification oscillator for utilization with detector 32 is of a different basic frequency than that of the identification oscillator 41. Thus, detector 32 could utilize an identification oscillator of a 600 cycle frequency and the output of detector 32 identification oscillator could be applied to modulator 42.

Thus, for example, as shown in FIG. 2, detector 32 delivers its signal to impulse generator 52 which can be identical with impulse generator 37 by means of channel 34 and then the output of impulse generator 52 is applied to wave train generator 53 by means of channel 54. The wave train generator 53 is identical with wave train generator 39 and the output of wave train generator 53 is applied to the input of identification oscillator 55. Identification oscillator 55 has a basic frequency of 600 cycles so that upon each activation of detector 32 a single square wave pulse is received from multivibrator 52 which generates in wave train generator 53 five pulses which are applied to identification oscillator 55 and generate therein a series five pulse trains in the form of 600 cycles for every pulse from the "one-shot" multivibrator 52.

The output of identification oscillator 55 is fed to single side band carrier suppressed modulator 42 by channel 57 wherein it modulates the carrier and is transmitted by means of transmitter 44 and antenna 51. It is therefore seen that the two detectors 28 and 32 can utilize a single modulator and receiver transmitter system, although each has its individual control impulse generator, wave train generator and identification oscillator. Of course, this represents a reduction in the amount of equipment necessary for use where the detectors are near enough for convenient wire cable connection, but individual modulator-receiver-transmitter systems can be used with detectors spaced by substantial distances.

Each of the components individually in the blocks shown in FIG. 2 is a standard commercial component. The multivibrators, the wave train generators, the oscillators, the carrier shifter, the receiver transmitter and the modulator are all commercially available and anyone skilled in the art can select a component which can be utilized in this system and will perform satisfactorily in accordance with the teachings of this invention. By way of example in FIG. 3, specific components are shown in schematic form. However, it should be well understood that the circuitry herein can be modified or changed in any way by one skilled in the art and still remain within the teachings of this invention since the invention lies in the system whch is the combination of the components shown in FIG. 2.

Figure 3:
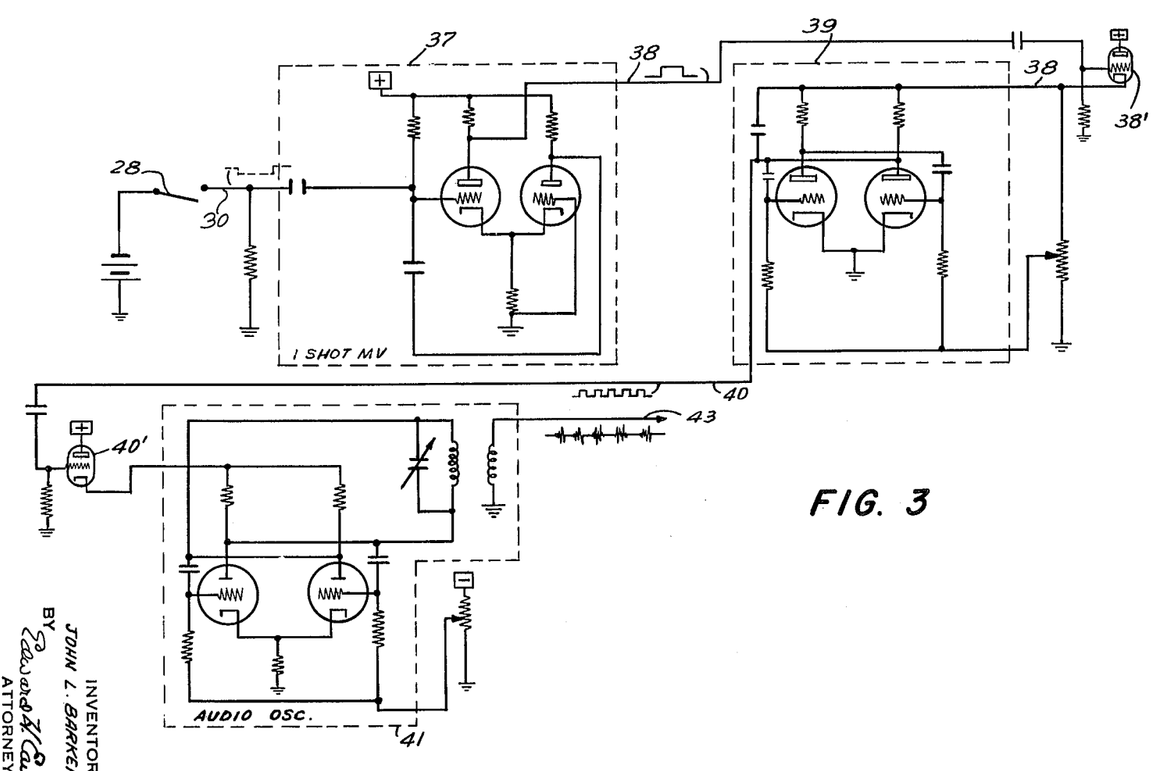
FIG. 3 illustrates in schematic form the detector unit circuitry.

FIG. 3 is a schematic drawing of the multivibrator, wave train generator, and identification oscillator, portions of detector 29. Detector 28 is attached at one end to the negative side of a direct current source. When the axle of a vehicle crosses detector 28 a negative signal is applied by lead 30 to the input of multivibrator 37 and the first tube which is now cut off goes positive and applies a single positive square wave pulse to lead 38 which is applied to the grid of coupling cathode follower 38′ whose cathode applies positive voltage to the plates of the tubes of the wave train generator 39. Both wave train generator 39 and identification oscillator 41 have output only when positive inputs are received. Upon the application of the positive input at lead 38 of wave train generator 39, a single group of five positive pulses is developed and appears on lead 40. The positive pulses of lead 40 are applied to the input of cathode follower 40′ which couples the identification oscillator to the wave train generator. The identification oscillator has a tuned plate circuit which is tuned to the desired frequency and for identification oscillator 41 this frequency is 400 cycles. For each positive pulse input into identification oscillator 41 a 400 cycle output wave appears on lead 43 so that the single negative square wave input pulse to the multivibrator from the detector results in five separated waves of 400 cycles at least 43 which upon reference to FIG. 2 is shown applied to modulator 42.

Figure 4A:
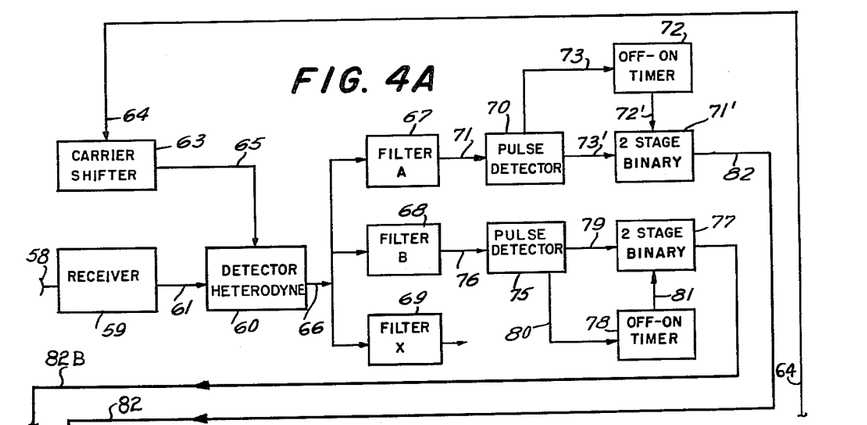
FIGS. 4A and 4B illustrate in diagrammatic form a remote master control unit which includes at its input and output sections the portions of the present invention necessary for converting information to a form for use in connection with the interlink.

The single side band carrier suppressed signals transmitted from transmitter 44 in FIG. 2 in response to reception of the carrier from the transmitter in the detector unit 29 are transmitted—when detector 28 is actuated—by antenna 51 shown in FIG. 2 and received by antenna 58 in FIG. 4A in the remote master control unit and receiver 59 and applied to heterodyne detector 60 by means of channel 61, which also has applied thereto the shifted carrier of the system which is derived from the carrier from the main transmitter 107 by carrier shifter 63 located at the master control unit.

For stabilization of the system a single carrier frequency is used throughout. This is generated in the main transmitter and shifted at the various positions so that it can be used. Actually all carrier shifts in the system are of equal amounts but they can be different in magnitudes if desired.

The frequency of the carrier is shifted in carrier shift circuit 63 to which it has been applied by means of channel 64 and then applied by channel 65 to the hetrodyne detector 60.

The audio identification signals are extracted from the mixture of the two shifted carriers from 61 and 65 in the heterodyne detector 60 and fed by means of channel 66 to a system of filters. The signal received at antenna 58 contains the previously mentioned 400 cycle identification signal, this 400 cycle signal is extracted from the carrier and applied by means of channel 66 to filters 67, 68 and 69. Since filter 67 is a single frequency pass filter, it will pass only the signal for which it is designed to pass, which in this instance, is the 400 cycle signal. Whereas filters 68 and 69 are designed to pass other frequencies and block frequencies of 400 cycles.

Filter 67 therefore performs the function of a gate which is open only for 400 cycle signals and allows this signal to pass therethrough to detector 70 by means of channel 71. Detector 70 is of the type which is well known in the art and designed to present to binary circuit 71′ a series of square wave pulses. The pulses at the output of detector 70 are developed by the series of 400 cycle waves which had been developed in identification oscillator 41 and transmitted through the system and which have passed through filter 67. Thus, for a single pulse from multivbrator 37 five square wave pulses are developed at the output of detector 70.

Detector 70 also feeds timer 72 by means of channel 73. The use of timer 72 and the two-stage binary 71′ in this system is a protective feature. The timer is any resettable timer commonly used for this purpose and can be of the well-known electronic type which upon receipt of the first pulse from the detector opens the counting circuit in the two stage binary which can continue to count providing the timer is reset within its normal period which is slightly greater than the period of a single pulse. If one of the pulses is not received or if a random pulse or pulses of irregular period are received, the timer will time out and reset the binary counter—thus preventing false output pulses on line 82.

The protective feature prevents traffic actuated master 74 from receiving signals which are extraneous noise or pick-up signals. Each channel has its associated detector and binary timer system. Thus, by way of example, in FIG. 4A of the drawings, filter 68 is shown feeding detector 75 through channel 76, which—in turn—feeds binary 77 and timer 78 by means of channels 79 and 80 respectively, and the timer 78 controls the operation of binary 77 through channel 81.

The output of binary 71′ is fed by means of channel 82 to traffic actuated master 74 as is the output of the remaining binary systems. The heterodyne detector 60 allows the composite signal to be applied simultaneously to all of the single frequency pass filters 67, 68 and 69 from which each binary system receives its respective signal which it applies to master 74 from which the master derives its operational data for programming the local controllers.

Thus sampling detectors 28, 32 and 32′ which represent any other detector feeding any other detector unit 33′ apply individually and concurrently, if required, impulses to proper input circuits of the vehicle actuated master controller.

As mentioned above, this system can be applied by way of example to a traffic actuated master, such as that disclosed in Patent No. 2,542,978, previously referred to, and a local controller of the type shown in application Serial No. 510,926, which was also referred to above. With this in mind, it is understood that traffic actuated master 74 is of the type disclosed and shown in Patent No. 2,542,978 in that by way of example detector 28 can represent inbound traffic and detector 32 can represent outbound traffic so that the signals received by way of filters 67 and 68 represent respectively inbound and outbound traffic. These signals can be then compared in the traffic actuated master 74 as taught in Patent No. 2,542,978 by way of example. It is obvious, of course, that the type of traffic actuated master which is used is incidental to this invention since the invention resides in the interlinking system rather than in the specific equipment used to interpret the signals received from the detector unit.

Figure 4B:
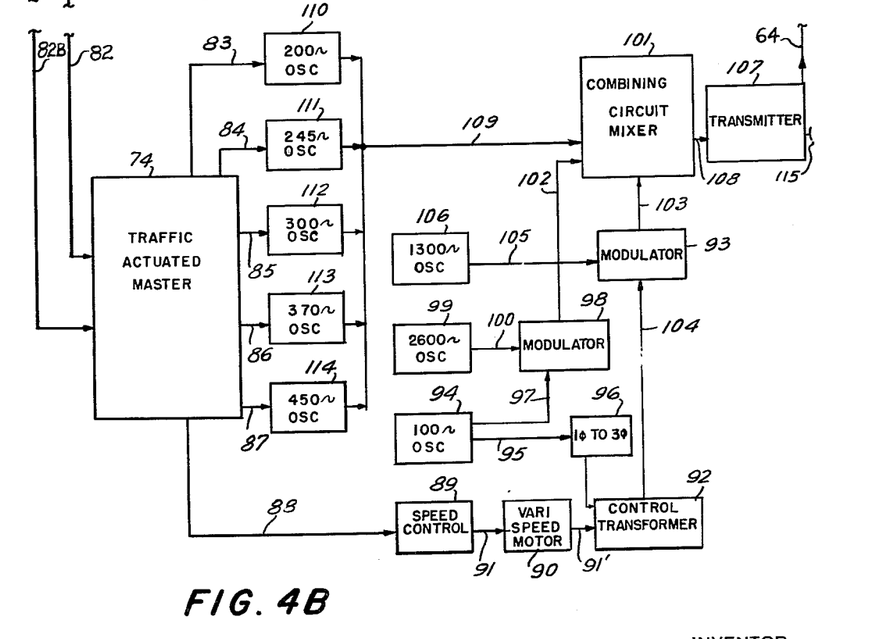

Channels 83, 84, 85, 86, 87 and 88 in FIG. 4B which are the output channels from the traffic actuated master 74 feed components with the interpretation of the information which has been made by the traffic actuated master 74. It is noted that channel 88 feeds into a speed control device 89, which can be a speed control of the type disclosed in application Serial No. 510,926, which—in turn—controls the speed of a variable speed motor 90 by means of channel 91. This drives synchro 92 which has a three-phase stator input and a single-phase rotor output which is fed to modulator 93 whose output is then incorporated as part of the output information over line 11 which later is decoded at the local controller to three-phase voltage for operation of the signal controller whereas in application Serial No. 510,926 the motor drives a differential generator which directly provides the three-phase voltage for the operation of the local controller. This same procedure is followed for both the $F_r$ and $F_c$ systems.

The stator voltage for control transformer 92 (which is similar to a synchro) is developed in oscillator 94 which is a stable oscillator operation at 100 cycles and which has its signal applied by means of channel 95 to the one-phase to three-phase changer 96, which then converts the single phase 100 cycle signal to a three-phase 100 cycle signal and applies it to the stator of the control transformer.

Additionally, the 100 cycle output of oscillator 94 is fed directly by channel 97 to modulator 98 which also has applied thereto a 2600 cycle signal which is developed in oscillator 99 and fed into modulator 98 by means of channel 100.

The output of modulator 98 is fed into a combining circuit mixer 101 by means of channel 102 and the output of modulator 93 is also fed into mixer 101 and this is accomplished by means of channel 103. It is noted that the modulator 93, in addition to having the control transformer output applied thereto by channel 104, has a 1300 cycle signal applied thereto by channel 105 which has been developed in oscillator 106.

These components convert the information received from the output of the traffic actuated master 74 by channel 88 to a form that can be used in the system disclosed in application Serial No. 510,926 and apply it to the mixer 101.

The 100 cycle signal generated in oscillator 94 represents the reference voltage and is applied to the mixer 101 superimposed upon a 2600 cycle voltage which is developed in oscillator 99. Another 100 cycle signal is applied to mixer 101 superimposed upon the 1300 cycle voltage which is developed in oscillator 106. This 100 cycle voltage represents the cycle line voltage and is progressively shifted in phase with respect to the 100 cycle reference voltage by control transformer 92 under control of variable speed motor 90 and the traffic actuated master 74.

The output of the mixer circuit is applied to transmitter 107 by means of channel 108 so that it can be transmitted to the local controller and detector units. Transmitter 107 can be any suitable radio frequency transmitter which is amplitude-modulated, phase-modulated, or frequency-modulated.

Additionally, an offset demand in accordance with the teaching of application Serial No. 510,926 is applied to the transmitter by means of the mixer 101 through channel 109. Each of the output channels 83, 84, 85, 86 and 87 from traffic actuated master 74 represent an offset demand such as in the application referred to above. For example, channel 83 can represent SC1; channel 84 can represent OC1; channel 85 can represent OC2; channel 86 can represent OC3; and channel 87 can represent OC4 by way of example.

The offset demand signal from the traffic actuated master 74 is applied to one of the oscillators 110, 111, 112, 113, 114, or any combination of these to be applied to the mixer by means of channel 109. By way of example, oscillator 110 is assumed to be a 200 cycle oscillator; oscillator 111 is assumed to be a 245 cycle oscillator; oscillator 112 is assumed to be a 300 cycle oscillator; oscillator 113 is assumed to be a 370 cycle oscillator and oscillator 114 is assumed to be a 450 cycle oscillator. Each of these oscillators can be any stable oscillator known in the art, such as a Colpitts oscillator, and the combined signal or the output thereof is fed to the mixer 101 and then applied to transmitter 107.

Thus, it is seen that a composite signal is transmitted by means of transmitter 107 and antenna 115 to the various local controllers and detector units. The detector units extract the carrier signal and utilize it in the manner explained above, whereas each local controller utilizes the composite signal transmitted by means of antenna 115 in a manner so that it can control its associated traffic signal as will be explained below.

Figure 5A:
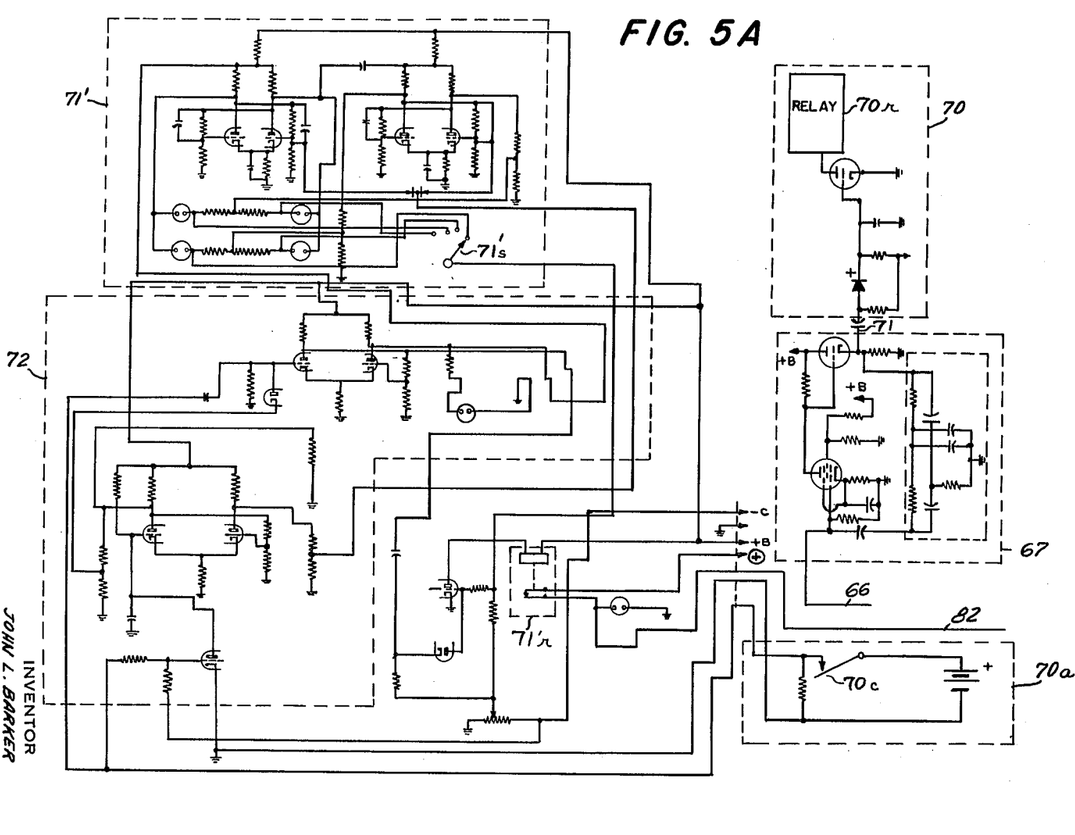
FIGS. 5A, 5B and 5C illustrate in schematic form a remote master control unit which includes at its input and output sections the portions of the present invention necessary for converting information to a form for use in connection with the interlink.
Figure 5B:
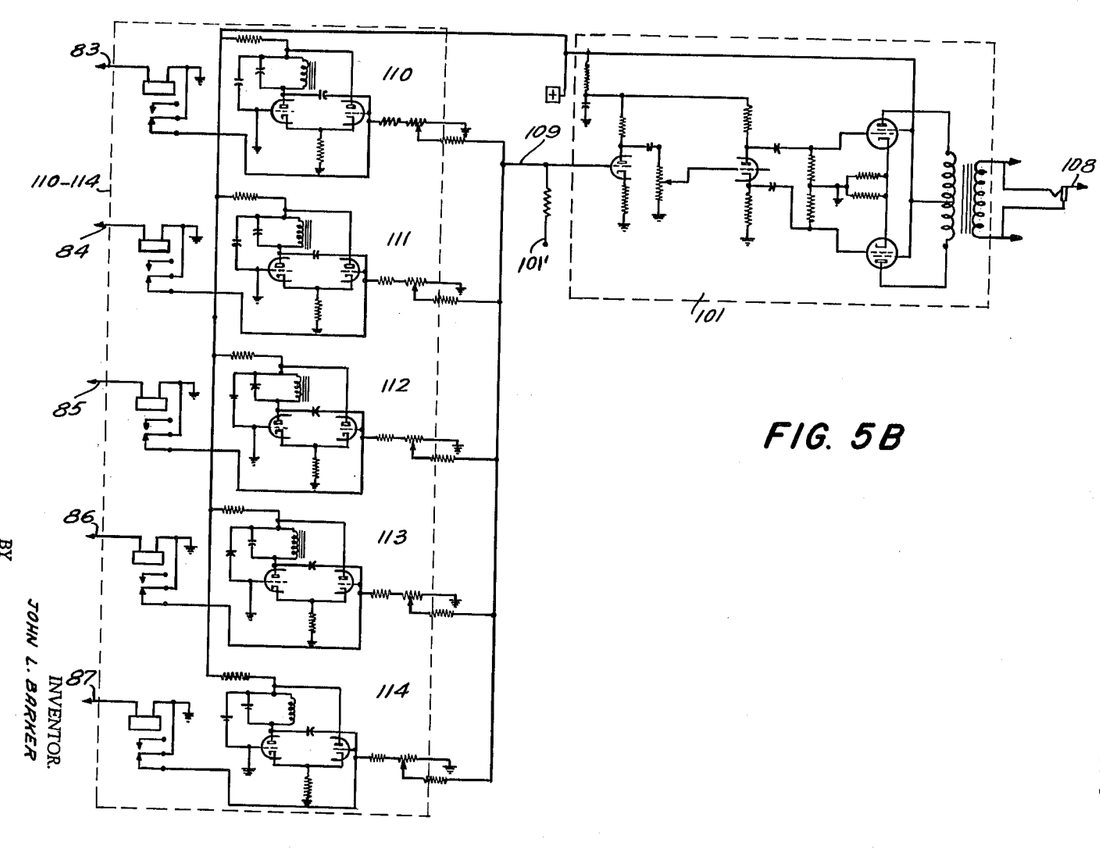
Figure 5C:
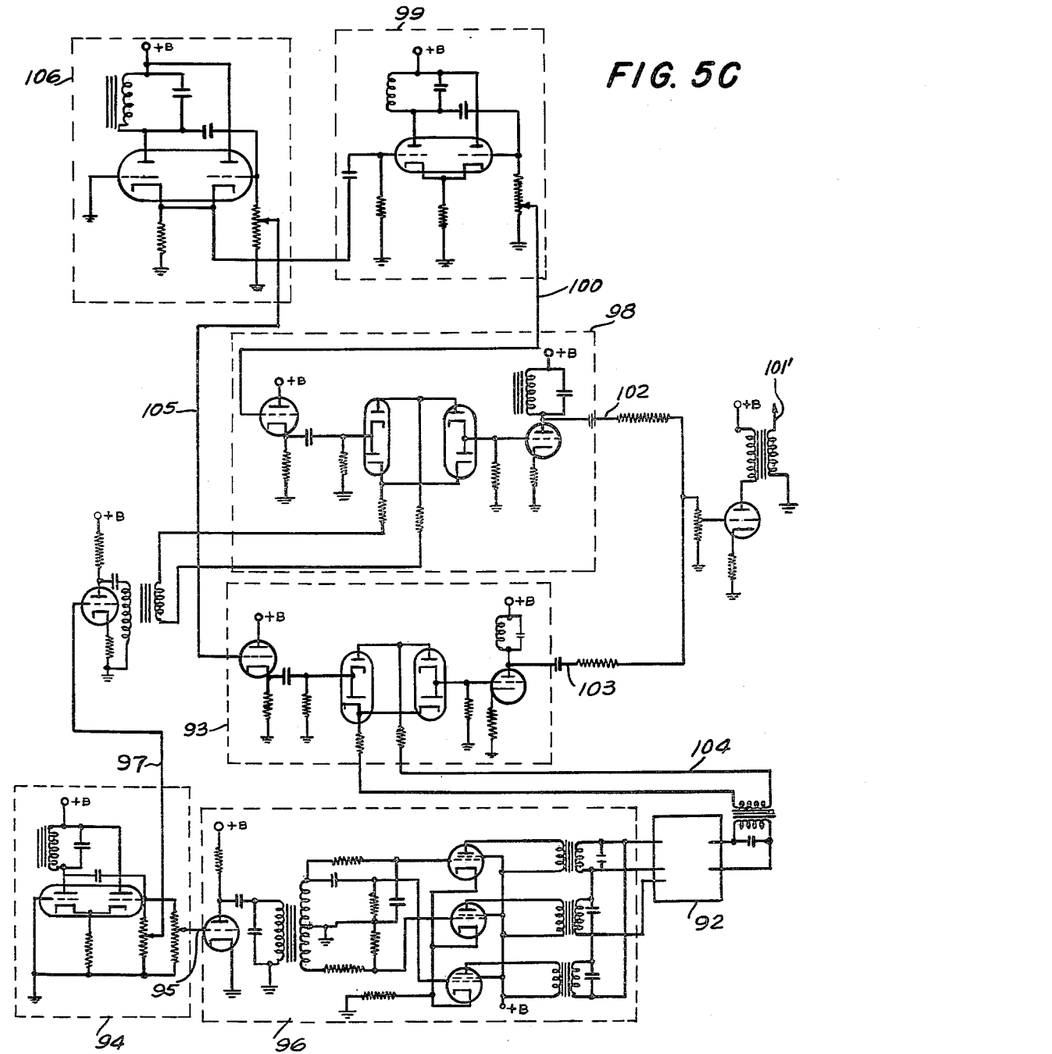

In FIGS. 5A, 5B and 5C a schematic is shown illustrating circuitry which can be used in the remote master control unit to utilize the teachings explained above. In FIG. 5A, channel 66 is shown representing the input to filter "A" which has been designated by the numeral 67 in the drawings, the output of filter represented by channel 71 is applied to pulse detector 70 energizing relay contacts 70a thereby applying voltage to on-off timer 72. The output of the two-stage binary on channel 82 is then applied to the traffic actuated master 74.

In FIG. 5B inputs 83 through 87 are shown to oscillators 110 through 114, respectively, which feed their outputs into mixer 101 by means of channel 109. The output of the mixer appears at lead 108 and is applied to transmitter 107.

In FIG. 5C oscillator 106, which is a 1300 cycle oscillator has its output applied to modulator 93 by means of lead 105. The output of modulator 93 appears at lead 103 and is applied through power amplifier to lead 101' which is shown in FIG. 5B as an input to mixer 101. The 2600 cycle oscillator designated by the numeral 99 applies its output to modulator 98 by means of channel 100 and the output of modulator 98 is applied by channel 102 and through the power amplifier to lead 101'. Also the output of 100 cycle oscillator 94 appears at lead 95 and is applied to one-phase to three-phase converter 96 and control transformer 92 whose output is fed through channel 104 to modulator 93. The output of modulator 93 which appears at lead 103 is applied through a power amplifier to lead 101' and then to combining mixer 101 and transmitter 107.

Figure 6:
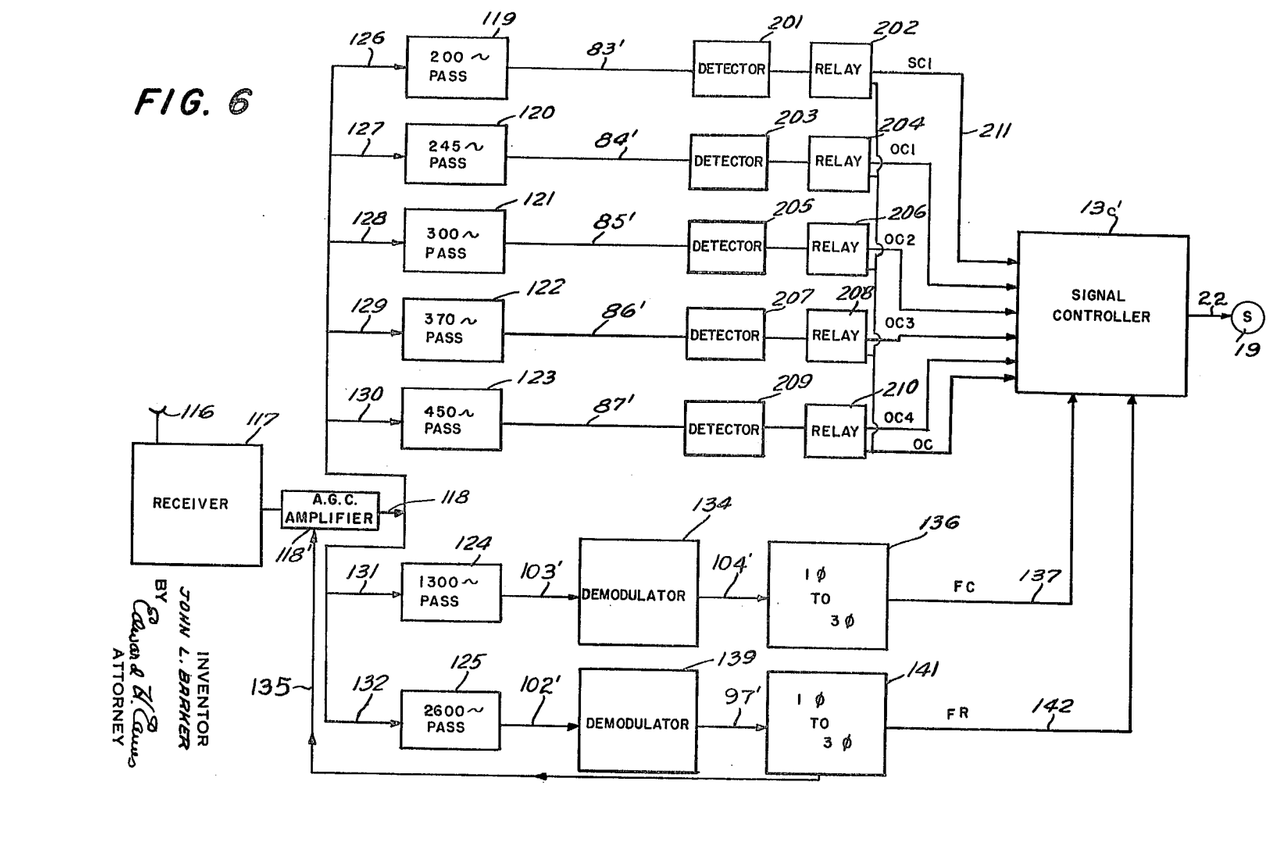
FIG. 6 illustrates in diagrammatic form a local control unit which can be used in connection with the present invention having an input unit which converts incoming information to a form suitable for use within.

In FIG. 6, a diagrammatic view of a sample local control unit is shown. The local control unit shown is designated 13 in FIG. 1. Antenna 116 of receiver 117 picks up the signal transmitted from the remote master control unit 10 and applies the received signal by means of channel 118 to a group of single-frequency pass filters 119, 120, 121, 122, 123, 124, 125 by means of channels 126, 127, 128, 129, 130, 131, and 132, respectively.

Each of the filters 119 to 123 is designed to pass a single-frequency. The filters 124 and 125 are designed for a band pass about the center frequencies of 1300 and 2600 cycles, respectively, in order to pass the 100 cycle modulations on these frequencies. The frequency that each filter is designed to pass is determined by the frequencies used in the oscillators 110, 111, 112, 113, 114, 106, and 99 utilized in the remote master control unit 10 shown in FIG. 4B. Filter 119 is designed to pass the frequency developed in oscillator 110 and no other frequency. Filter 120 is designed to pass the frequency developed in oscillator 111 and no other frequency. Filter 121 is designed to pass the frequency developed in oscillator 112 and no other. Filter 122 is designed to pass the frequency developed in oscillator 113 and no other; and filter 123 is designed to pass the frequency developed in oscillator 114 and no other. Filter 124 is designed to pass the frequency developed in oscillator 106 and the side bands resulting from oscillator 94; and filter 125 is designed to pass the frequency developed in oscillator 99 and the side bands from oscillator 94.

The 200 cycle oscillator 110 in remote master control 10 represents the SC1 selection, therefore, the output of filter 119 in effect represents the output of oscillator 110. Likewise, the output of filter 120 represents the output of oscillator 111; filter 121 represents the output of oscillator 112; filter 122 represents the output of oscillator 113; filter 123 represents the output of oscillator 114. This is represented in FIG. 6 by designating the output channels of the filters with the number designation of the input to the oscillators in FIG. 4B with a prime following. Thus the output of filters 119, 120, 121, 122 and 123 are represented by channels 83', 84', 85', 86' and 87', respectively, which are applied to signal controller 13c', which can be of the type shown and described in my co-pending application Serial No. 510,-926, which was previously referred to.

The outputs from filter 119 through 123 are applied to signal controller 13c' through detectors 201, 203, 205, 207 and 209, respectively, and relays 202, 204, 206, 208 and 210, respectively, in the conventional manner.

The output of filter 124, which is designated in the drawings by the numeral 103', represents the output of modulator 93 of FIG. 4B. This voltage is applied to de-modulator 134 whose output is the control signal which is a 100 cycle signal plus or minus the difference of frequency developed by the phase shift at the output of control transformer 92, resulting from the variable speed motor 90. The de-modulator 134 output on channel 104' represents the same voltage on channel 104 in FIG. 4B. This is applied by channel 104' to converter 136, which converts this single-phase voltage to a three-phase voltage and applies it by means of channel 137 to signal controller 13c'. The input channel 137 to the signal controller 13c' represents the control voltage as shown in my said co-pending application Serial No. 510,926.

The signal with the reference voltage therein is the voltage imposed on the 2600 cycle carrier and is extracted from the received signal by the filter 125. The output thereof is designated by the numeral 102' in FIG. 6 corresponding to channel 102 in FIG. 4B. This voltage is applied to de-modulator 139, the output of which is applied by channel 97' (which corresponds to channel 97 in FIG. 4B), to converter 141, which converts it from a single-phase voltage to a three-phase voltage and applies it by means of channel 142 to the signal controller 13c' as a reference voltage. Signal controller 13c' operates upon receipt thereof and applies the information received from receiver 117 in accordance with the teachings of my co-pending application Serial No. 510,926 and controls the operation of traffic signal 19 by channel 22.

Referring to FIG. 1, note that the traffic control system contains local control units 12, 13 and 14. The local control unit 12 includes signal control 12c which is actuated through detectors 25 and 27 so that the unit can be a locally actuated unit. Such a signal control is the subject of my co-pending application Serial No. 688,-080, filed on October 3, 1957. Local control units 13 and 14 include signal controls 13c and 14c which are non-locally actuated. This type controller is the subject of my co-pending application Serial No. 510,926, filed May 25, 1955. Either of these types can be utilized herein and both are shown in FIG. 1 by way of example. Control unit 12 is regarded as a local traffic actuated controller and control units 13 and 14 are regarded as non-locally actuated controllers since they are controlled by traffic actuation only through the traffic actuated master controller. Certain features, such as employing slow progressive phase shift between two electrical wave energies transmitted to the local controller and coincidence response through phase comparison, are common to the local control apparatus of both of these co-pending applications. There are other portions of these structures which are common and portions of the structures are not common to each other. These are referred to herein by way of example only and it is understood that many other types local controllers may be used in the practice of this invention.

Figure 7:
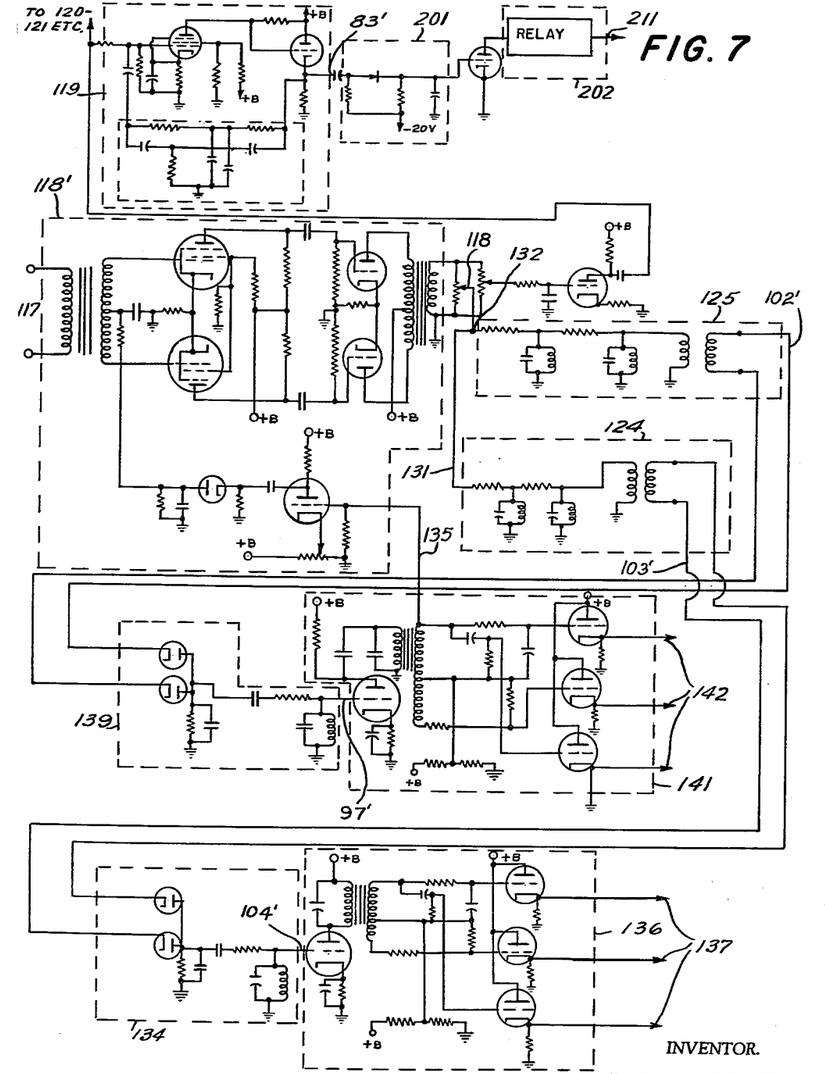
FIG. 7 illustrates in schematic form the local control unit shown in FIG. 6.

FIG. 7 is a schematic illustrating circuitry which can be used in a local control unit in order to utilize the teachings of my invention. The signal from receiver 117 appears on lead 118 and is applied to AGC amplifier 118'. The output of amplifier is then applied to filters 119, 120, 121, 122 and 123. Filter 119 which is the 200 cycle pass filter is representative of these and shown in FIG. 7. The output of filter 119 is applied by lead 83' to detector 201 and then to relay 202, the output of which appears on lead 211 which is directed to the signal controller 13c'.

The output of amplifier 118' is also applied to the 1300 cycle pass filter 124 and 2600 cycle pass filter 125 by means of leads 131 and 132, respectively. The output of filter 124 appears at lead 103' and is applied to the input of de-modulator 134 and then by lead 104' to the one-phase to three-phase converter 136, the output of which appears at leads 137 which is applied to signal controller 13c'. Likewise, the output of filter 125 appears at lead 102' and is applied to the input of de-modulator 139 and then to single-phase to three-phase converter 141 by means of channel 97'. The output of converter 141 appears at lead 142 and is applied to signal controller 13c'.

Thus it is seen that I have provided a system wherein a single remote master controller operates and controls several local signal control units without wires linking them together and also receives information from detector units located at various points throughout a highway system and can operate upon this information to determine which electrical signals will be applied to the local control units to control them in accordance with the teachings of this invention.

The interlinking system described above may be modified to arrive at a second embodiment which consists of the use of a two-wire system interconnecting the various components. Thus a two-wire system would interconnect the master controller with each of the local controllers and in turn would interconnect each of the detectors with the master control unit. Although a certain amount of installation would be required with the second embodiment, the use of the invention described herein makes for a considerable reduction in the amount of wiring and installation necessary since only two wires are necessary for each link.

For this embodiment, FIG. 2 of the drawings is modified in that receiver 45, carrier 46, and single side band carrier suppressed modulator 42, together with its associated transmitter would not be used and the output of the identification oscillators 41 and 55 would be applied directly to a pair of wires; one acting as a ground wire. Thus, a single wire would connect the outputs of the various oscillators, such as oscillator 41, oscillator 55, and an additional wire would be used as the ground of the system.

FIG. 4A of the drawings is modified in that the wires mentioned in connection with FIG. 2 would be connected directly to the filters 67, 68 and 69 and the carrier shifter 63, receiver 59 and heterodyne detector 60 would be eliminated. Likewise, in FIG. 4B the output of the master, the R.F. transmitter 107 and its associated antenna would be omitted and two wires would extend from the output of the mixer 101 to each of the various local controllers and the composite signal output of mixer 101 would be applied to the input of the filters in the local controlling system. The two wires in FIG. 6 would be applied directly to the input to the filters, and receiver 117 and antenna 116 would be eliminated.

It is seen, therefore, that the interlinking system for traffic control apparatus which has been disclosed herein allows for transmission of information among the various components while avoiding the use of multiple wire installations. Also, the system disclosed is adaptable for use with conventional systems now in use and also can be used to interconnect certain portions of conventional systems now in use so that these portions can continue to be interlinked or interconnected in the present conventional manner.

Thus, among others, the several objects in the invention, as specifically aforenoted, are achieved. Obviously, numerous changes in construction and rearrangement of parts might be resorted to without departing from the spirit of the invention as defined by the claims.

As one example of a radio frequency which may be used for the radio link, but without limitation thereto, a transmission frequency of 960 megacycles may be used outward from the master with a shift of the order of two or three megacycles at the sampling locations in the carrier shifter and a consequent re-transmission frequency of the order of 962 or 963 megacycles from the sampling point to the master. As another example without limitation thereto, such radio carrier frequencies might be of a much lower order, such as 450–452 megacycles.

While the invention has been described, at least in substantial part above, from the viewpoint of its aspect as a linking system for the transmission of traffic sampling information from one or more points to a remote central or master point, or for the transmission of traffic control information from the central or master point to one or more individual traffic control points, or both, it will also be understood that the invention relates in another aspect to a complete traffic control system, employing such transmission, and that such transmission may employ an all-radio link or an all-wire link or may employ a radio link for one part and a wire link for another part.

I claim:

1. An interlinking system for traffic control apparatus of the type having a local traffic signal control operated in response to information received from a remote master control unit which receives information as to vehicle flow from one or more sampling positions including in combination: a sampling detector; a detector unit comprising an impulse generator of the type having an output of pulses of controlled lengths in response to signals received from said sampling detector, a wave train generator which provides a series of square pulses in response to each pulse reecived from said impulse generator, an identification oscillator having a substantially stable frequency of operation which identifies the wave train generator which activates the identification oscillator in accordance with pulses received from the wave train generator; a remote master control unit including a filter designed to pass only the frequency of said identification oscillator, a decoder means for supplying a series of pulses when energized by the output of said filter to identify said sampling detector signal, a master control means for receiving the series of pulses from said decoder unit and for interpreting the same, an oscillator for producing a reference frequency voltage, a reference frequency carrier oscillator, means for modulating said reference frequency voltage on said reference frequency carrier, a combining circuit connected for receiving the output of said modulator, a control frequency signal carrier frequency oscillator, a second modulator, means for generating a control frequency signal voltage varying in phase with respect to said reference frequency in accordance with information received from said master control, means for connecting the output of said control frequency signal voltage for modulating said control frequency signal carrier frequency at said second modulator, means for connecting the output of the second modulator to said combining circuit, a plurality of fixed frequency oscillators having an output means connected to said combining circuit, means for controlling oscillators of said plurality from said master control, means for connecting the output of said identification oscillator to the input of said filter; a local control unit comprising a plurality of input filters each designed to pass a substantially single frequency, a signal control means, one of said filters designed to pass said control frequency carrier, another of said filters designed to pass said reference frequency carrier, the remaining filters designed to pass the frequencies of said plurality of oscillators; means including demodulators for deriving the control frequency signal and reference frequency signal respectively from the respective carrier outputs from said one and said another filters and for supplying the demodulated reference and control frequency to said signal control, and means for supplying the output of said remaining filters to said signal control; means for transmitting the output of said combining circuit to the input of said plurality of filters; and a traffic signal controlled by said signal control.

2. An interlinking system for traffic control apparatus of the type having a local traffic signal control operated in response to information received from a remote master control unit which receives information as to vehicle flow from one or more sampling positions in accordance with claim 1, in which the means for transmitting the output of said combining circuit from the remote master includes a carrier frequency oscillator, and in which the means for transmitting the output of the identification oscillator to the input of the identification filter comprises a single side band carrier suppressed modulator which is fed with the output of the identification oscillator, a radio frequency transmitter which is modulated by the output of said modulator, a radio frequency receiver which receives the carrier frequency transmitted from the remote master control unit, a carrier shifter which shifts the received carrier wave and applies it to the single side band carrier suppressed modulator, a second receiver associated with the remote master control unit which receives the signal transmitted from said radio frequency transmitter, a heterodyne detector which is activated by the output of said second receiver and whicvh has applied thereto the shifted carrier frequency from the master and applies its output to the filter, and a third radio frequency receiver associated with the local control unit for receiving the signal transmitted from the remote master radio frequency transmitter for applying it to the plurality of filters.

3. An interlinking system for traffic control apparatus of the type having a local traffic signal control operated in response to information received from a remote master control unit which receives information as to vehicle flow from one or more sampling positions in accordance with claim 1, in which the means for applying the output of the identification oscillator in the detector unit to the input of the identification filter in the remote master control unit includes a two-wire system and the means for applying the output of the combining circuit in the remote master control unit to the input of the plurality of filters in the local control unit includes a two-wire circuit.

4. In an interlinking system for traffic control apparatus a detector unit comprising in combination a sampling detector of the type which can be activated by passing vehicles, a control impulse generator which receives signals from the sampling detector in response to activation by a passing vehicle, a wave train generator which develops a series of waves in response to a pulse from the control impulse generator, an identification oscillator which is keyed by the output of the wave train generator and means for transmitting the output of the identification oscillator to a remotely located master control unit.

5. In an interlinking system for traffic control apparatus a detector unit in accordance with claim 4 in which the means for transmitting the output of the identification oscillator to the remotely located master control unit consists of a single side band carrier suppressed modulator which receives signals from the identification oscillator, a radio frequency receiver which receives the carrier frequency from a remote radio frequency carrier transmitter, a carrier shifter which receives the output of the radio frequency receiver and shifts the frequency thereof and applies it to the single side band carrier suppressed modulator and a radio frequency transmitter which is modulated by the single side band carrier suppressed modulator.

6. In an interlinking system for traffic control apparatus a detector unit in accordance with claim 4 in which the means for transmitting the output of the identification oscillator to the remote master control unit consists of a two-wire system.

7. In an interlinking system for traffic control apparatus having a plurality of local controllers, a remote master control unit including in combination an input circuit comprising a receiver, a heterodyne detector which receives the output of said receiver, a single frequency pass filter which has applied thereto the output of the heterodyne detector, a decoding circuit which receives the output of said filter, a master control which interprets the signal received from the output of said decoding circuit; an output circuit consisting of a plurality of oscillators designed to operate at different fixed frequencies which receive the output of said master control and which are energized in accordance therewith, a combining circuit which receives the output of said oscillators, a source of reference voltage superimposed upon a carrier and applied to said combining circuit, a source of control voltage superimposed upon a carrier and applied to said combining circuit, and means transmitting the output of said combining circuit to said local controllers.

8. In an interlinking system for traffic control apparatus a remotely located master control unit in accordance with claim 7, in which the means for transmitting the output of the combining circuit to a local controller consists of a radio frequency transmitter.

9. In an interlinking system for traffic control apparatus a remotely controlled master unit in accordance with claim 7, in which the means for transmitting the output of the combining circuit to the local controller consists of a two-wire system from the output of the combining circuit to the local controllers.

10. In a system for the control of traffic, a traffic information receiving station including a radiating radio frequency transmitter, a traffic sampling station remote from said traffic information receiving station including a radio receiver, said receiver including means for receiving the radiated radio frequency wave transmitted from said transmitter to said receiver, means for shifting in frequency said received radio frequency wave, means for modulating the shifted wave with detected traffic information, and means for transmitting said modulated shifted wave to said traffic information receiving station.

11. In a system for the control of traffic, a traffic information receiving station including a radiating radio frequency transmitter, a traffic sampling station remote from said traffic information receiving station including a radio frequency receiver, said receiver including means for receiving said radiated radio frequency wave transmitted from said transmitter, means connected for shifting in frequency said received radio frequency wave, means for modulating said shifted wave in accordance with traffic information at said sampling station, thereby producing sidebands, and means for transmitting to the information receiving station only the sideband modulation, and means at said information receiving station for demodulating said received sideband wave at said traffic information receiving station.

12. A system for the control of traffic in accordance with claim 11, in which the means modulating the shifted wave includes means for developing a predetermined number of spaced pulses in accordance with the flow of traffic past the sampling station.

13. A system for the control of traffic in accordance with claim 12, in which the demodulator at the receiving station includes a resettable binary counter and a resettable timer for resetting the counter when time spacing between received pulses exceeds a predetermined value slightly greater than the spacing of the pulses as transmitted from said sampling station and means for providing an output pulse at said information receiving station from said binary counter only in response to said predetermined number of pulses since the last previous reset by said timer.

14. In a system for the control of traffic, a traffic information receiving station, a traffic sampling station remote from said traffic information receiving station, a radio frequency transmitter positioned at said information receiving station, a radio frequency receiver positioned at said sampling station, said radio frequency receiver being connected for receiving a radio frequency wave transmitted from said transmitter to said receiver, means at said sampling stations connected for shifting in frequency said received radio frequency wave, identification oscillator means providing an identification frequency for identification of said sampling station, and means for modulating said shifted wave with said identification frequency, means for transmitting the shifted wave as so modulated to said receiving station, and said information receiving station including frequency selective means for providing an output in response only to said modulations.

15. A system for the control of traffic in accordance with claim 14, in which there is provided a plurality of sampling stations each having an identifying frequency oscillator at a different identifying frequency and the information receiving station is provided with a plurality of frequency selective means for providing individual respective outputs in response only to the respective identifying frequencies.

16. A method of regulating the flow of traffic including first sampling at a plurality of stations the number of vehicles flowing past a sampling station in a given period, developing an electrical signal which identifies each sampling station and specifies the number of vehicles flowing, modulating the carrier of a radio frequency transmitter at each station with the electrical signal, each carrier having substantially the same frequency, receiving the transmitted information at a remotely located master control unit, demodulating the received wave to extract the information therefrom, developing an information signal in response to the demodulated signal at the master control unit, modulating the carrier of a radio frequency transmitter with the information signal, transmitting the information signal to a receiver in a local control unit, demodulating the wave received at the local control unit and applying the information received to a traffic signal control.

17. In an interlinking system for traffic control apparatus, a local traffic control unit including in combination means for receiving a composite signal including at least a control signal and a reference signal, said reference signal having an electrical value continuously cyclically occurring at a first rate and said control signal having an electrical value continuously cyclically occurring at a second rate slightly different from the first rate so that similar values of both signals simultaneously occur in a cyclic manner at a third rate inversely dependent upon the difference between the first and second rates, a multiplicity of single frequency pass filters having a common input connected for receiving said composite signal, one of said filters being tuned to pass said control signal and another of said filters being tuned to pass the reference signal, a traffic signal control means connected for receiving the signals passed through said filters, said traffic control means including means connected for electrically comparing the electrical values of the passed control and reference signals for providing an electrical output signal cyclically at said third rate in response to the cyclic occurrence of simultaneous equal values of said reference and control signals for cyclically controlling traffic signals at the third rate.

18. In an interlinking system for traffic control apparatus a local control unit in accordance with claim 17 in which the means for receiving the composite signal and applying the same to the input of the filters includes a radio frequency receiver.

19. A system for the control of traffic including in combination a master control unit, means connected to said master control unit for interpreting received electrical signals for input to said master control unit, a traffic sampling means remote from said master control unit for providing electrical signals in accordance with sampled traffic, means for transmitting electrical signals from the sampling means to the master control unit, a local signal control means remote from said master control unit, and further transmission means for transmitting electrical signals from said master control unit output to said local signal control, said further transmission means from the master control unit including a radio frequency transmitter and receiver operating upon a carrier frequency developed in and received from the master control unit and said transmission means from the sampling station including a second radio frequency transmitter at the sampling station and a second radio receiver connected to said interpreting means, and means connecting both said second transmitter and receiver for control in response to said carrier for operation on a second carrier frequency.

20. A system for the control of traffic in accordance with claim 19, in which means is provided at the traffic sampling means to modulate the carrier received from the master control unit to identify the traffic sampling means and to carry traffic sampling information therefrom.

21. A system for the control of traffic in accordance with claim 19, in which the traffic sampling means includes an encoder which modifies the carrier frequency and the master control unit is provided with a decoder which extracts information from said modified carrier.

22. In an interlinking system for traffic control apparatus, a local traffic control unit including in combination, means for receiving a composite signal including at least a variable control frequency signal and a reference frequency signal, said reference signal having an electrical value continuously cyclically occurring at a first rate and said control signal having an electrical value continuously cyclically occurring at a second rate slightly different from the first rate, remote means for varying the second rate with respect to said first rate so that a similar value of both signals simultaneously occur in a cyclic manner at a variable third rate inversely dependent upon the difference between the first and second rates and of the order of a traffic signal cycle, a multiplicity of single frequency pass filters having a common input connected for receiving said composite signal, one of said filters being tuned to pass the variable control frequency and another of said filters being tuned to pass the reference frequency, a traffic signal control means connected for receiving the signals passed through said filters, said traffic control means including means connected for switching traffic signals at said variable third rate in response to the control and reference signals and means for initiating switching of the traffic signals at a time depending upon information in said composite signal passing through a further one of said filters to said traffic control means.

23. A master-local traffic control system comprising: a master controller including a radio frequency carrier oscillator, a source of reference frequency signals having a first cyclic rate, a source of control signals having a second cyclic rate differing only slightly in rate from the reference signal, means for varying the second rate, a further signal source, radio frequency means for transmitting said reference, control, further and carrier signals as a composite signal; a local traffic controller including a radio receiver having an input and an output and a detector connected for receiving at the input the transmitted signal and for providing detected further, control and reference signals at the output; a plurality of selective filter means, signal control means for controlling traffic signals, and means connecting one selective filter for passing the detected further signal from the receiver output to the signal control means, and means including a connection of other filter means for passage of the detected control and reference signals from the receiver output to the signal control means for controlling the traffic signals at a rate determined by the variation of the control signal with respect to the reference signal.

24. A system for the control of traffic including in combination a master control unit, means connected to said master control unit for interpreting received electrical signals received thereat for input to said master control unit, a plurality of traffic sampling means remote from said master control unit for providing electrical signals in accordance with sampled traffic, means for transmitting electrical signals from each sampling means to the master control unit, a plurality of local signal control means remote from said master control unit, and transmission means from said master control unit output to each said local signal control, said transmission means from the master control unit including a radio frequency transmitter and receiver operating upon a carrier frequency developed in and received from the master control unit, and said sampling transmission means including a radio transmitter and receiver both connected for operation on a second carrier under the control of the carrier from the master thereby providing a stable second carrier frequency common to all of said plurality of sampling stations for transmission of the sampled information to said master receiver for interpretation thereat.

25. The combination as in claim 24 further including means including a sampling receiver connected for receiving the remote carrier and for shifting said carrier to a second carrier frequency and in which said sampling transmitter includes means for modulating said second carrier and for transmitting a sideband of said resulting modulation while eliminating the second carrier so that the sampling stations will transmit information only when so modulated thereby decreasing interference between sampling stations.

26. A traffic control system for interconnecting a plurality of traffic sampling stations and a plurality of local traffic controllers with a central station by the use of only two stable carrier frequencies including means at the central station for generating a first stable carrier frequency, means for modulating said first carrier and for transmitting said carrier as so modulated to both said plurality of local controllers and sampling stations, means at each of said local controllers for receiving said modulated waves and for controlling traffic signals in response to the received modulation, means at each said sampling station for receiving said first carrier, means at each sampling station for shifting in frequency said received first carrier to thereby provide a second carrier having substantially the same frequency at each sampling station; identification means at each sampling station, each said identification means having a different identification signal; means at each sampling station for modulating its second carrier with both traffic information and identification information for transmission to said central station, means at said central station for receiving signals from all of said sampling stations and for demodulating the received identity and traffic information signals for controlling the modulation of the first carrier.

27. In a master-local traffic control system in which the master transmits first and second signals cyclically repeating at slightly different rates and in which means are provided to vary the rate of one signal with respect to the other, a local traffic controller including a means connected for receiving and passing to an output a composite signal including said first and second signals, first and second filter means commonly connected to said output, said first and second filters being tuned to pass said first and second signals respectively, means for converting one of said passed signals to a polyphase signal, and traffic control means including means for comparing said polyphase signal with the other passed signal for controlling traffic signals at a rate dependent upon the difference in rates between the polyphase signal and the other passed signal as determined by variation at the master.

References Cited in the file of this patent

UNITED STATES PATENTS

| | | |
|---|---|---|
| 2,301,004 | Adler | Nov. 3, 1942 |
| 2,719,284 | Roberts | Sept. 27, 1955 |
| 2,863,073 | Blow | Dec. 2, 1958 |
| 2,866,962 | Ellett | Dec. 30, 1958 |
| 2,876,341 | Likel | Mar. 3, 1959 |
| 2,883,647 | Leeds et al. | Apr. 21, 1959 |
| 2,933,716 | Soderberg | Apr. 19, 1960 |